(No Model.) 6 Sheets—Sheet 5.

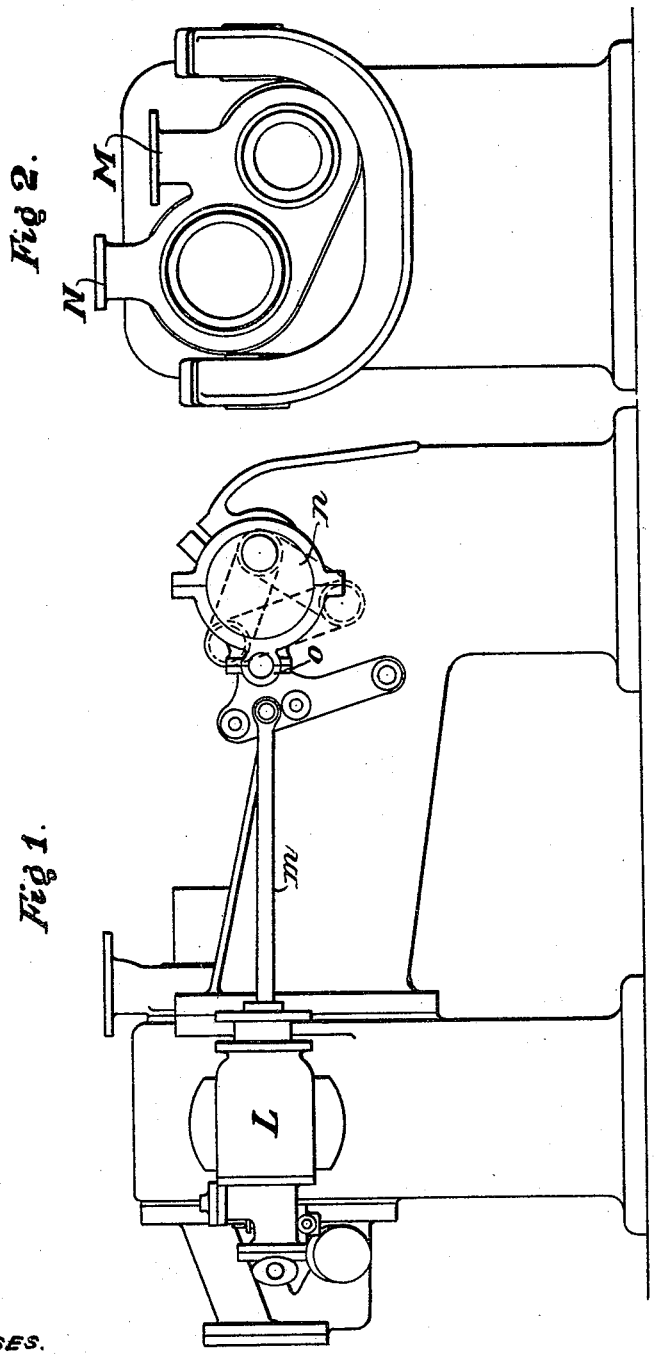

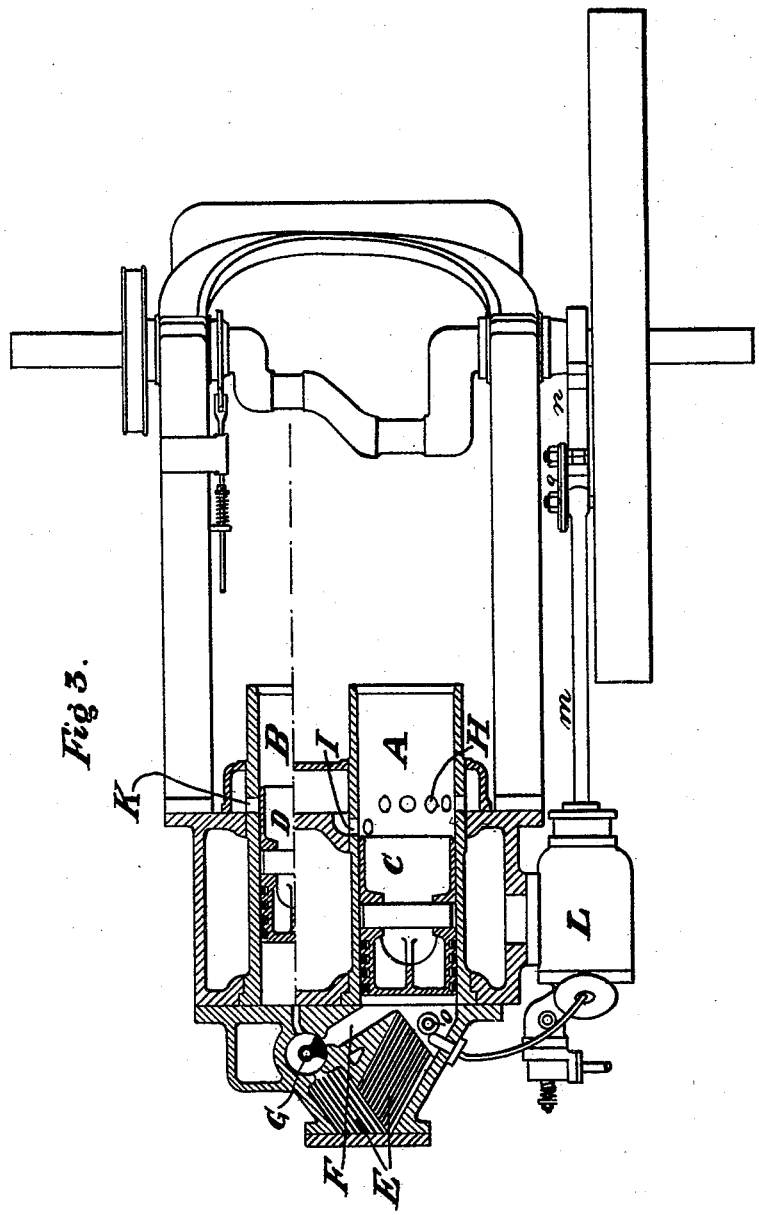

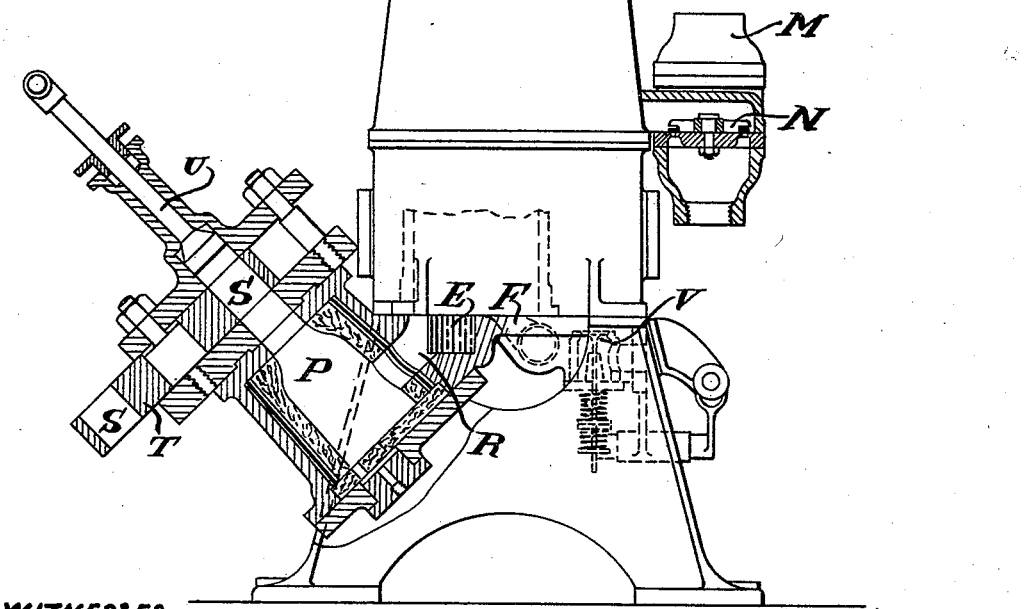

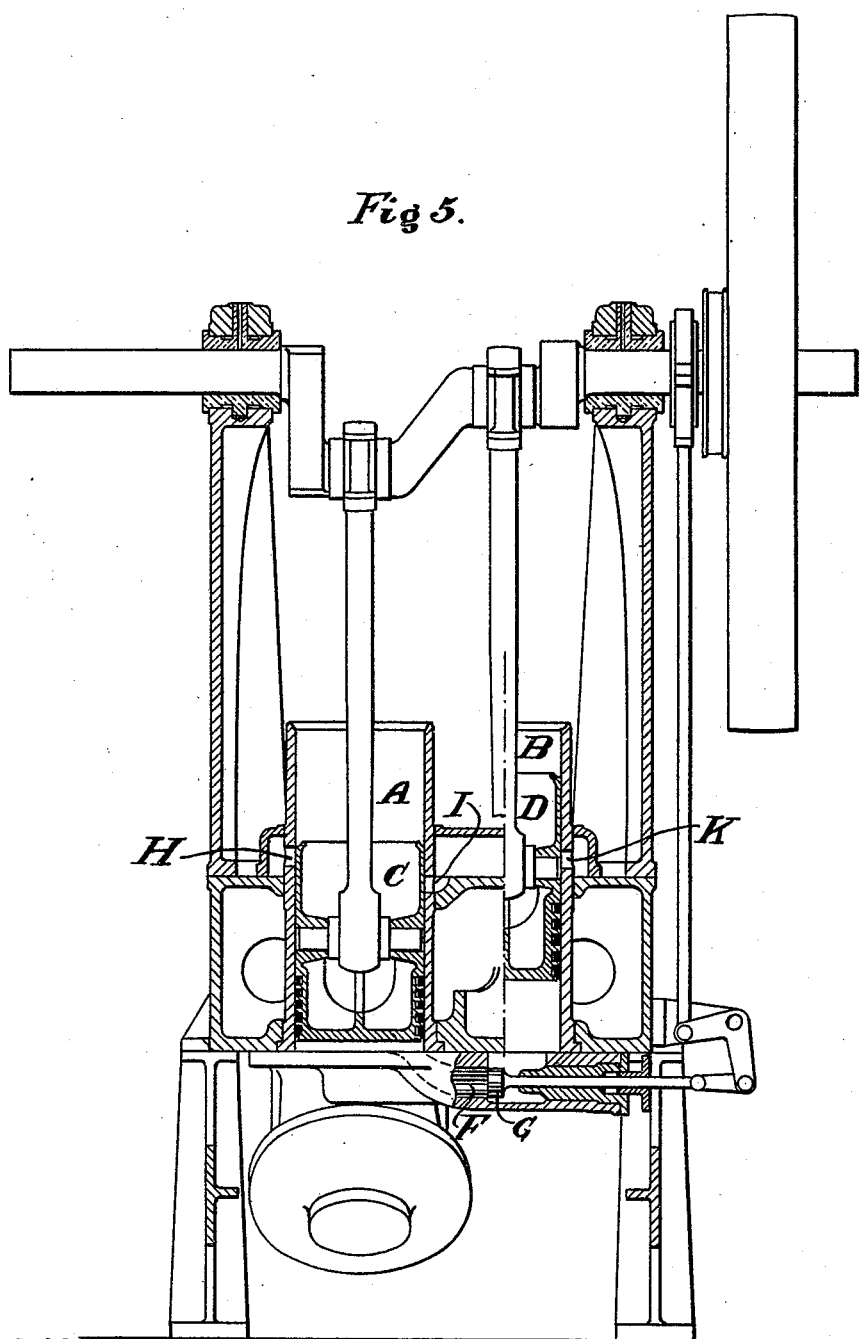

J. ATKINSON.
INTERNAL COMBUSTION HEAT ENGINE.

No. 454,936. Patented June 30, 1891.

WITNESSES.
G. E. Priddle
J. P. Rock

INVENTOR.
James Atkinson

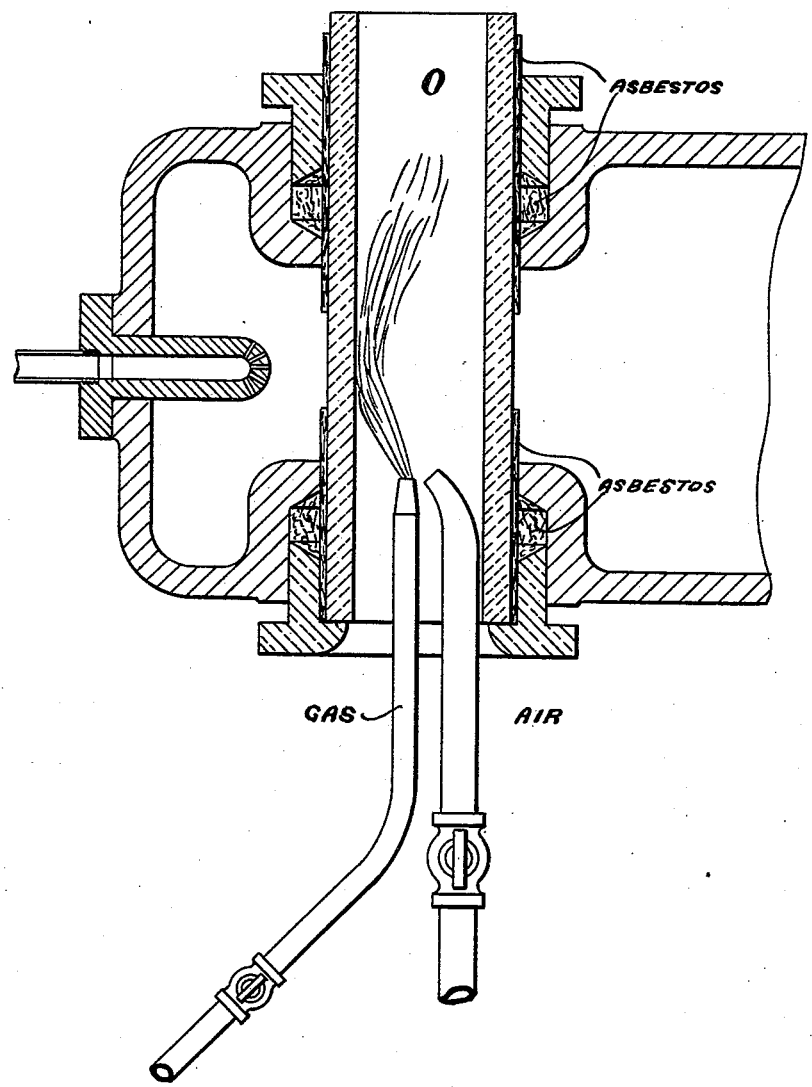

UNITED STATES PATENT OFFICE.

JAMES ATKINSON, OF LONDON, ENGLAND.

INTERNAL-COMBUSTION HEAT-ENGINE.

SPECIFICATION forming part of Letters Patent No. 454,936, dated June 30, 1891.

Application filed November 29, 1890. Serial No. 373,099. (No model.) Patented in England December 20, 1889, No. 20,482.

*To all whom it may concern:*

Be it known that I, JAMES ATKINSON, a subject of the Queen of England, residing at Hampstead, in the city and county of London and Kingdom of England, have invented certain new and useful Improvements in Internal-Combustion Heat-Engines, (for which I have made application for Letters Patent in Great Britain under No. 20,482 and date of December 20, 1889,) of which the following is a specification.

This invention relates to improvements in internal-combustion heat-engines; and it has for its object to permit the application of a regenerator in a satisfactory manner to such engines, whether the heat be obtained from internal combustion either of gas, oil, or liquid fuels or of coal, coke, or other solid fuels, and for the purpose of regulating the working medium in the engine.

Figure 6:
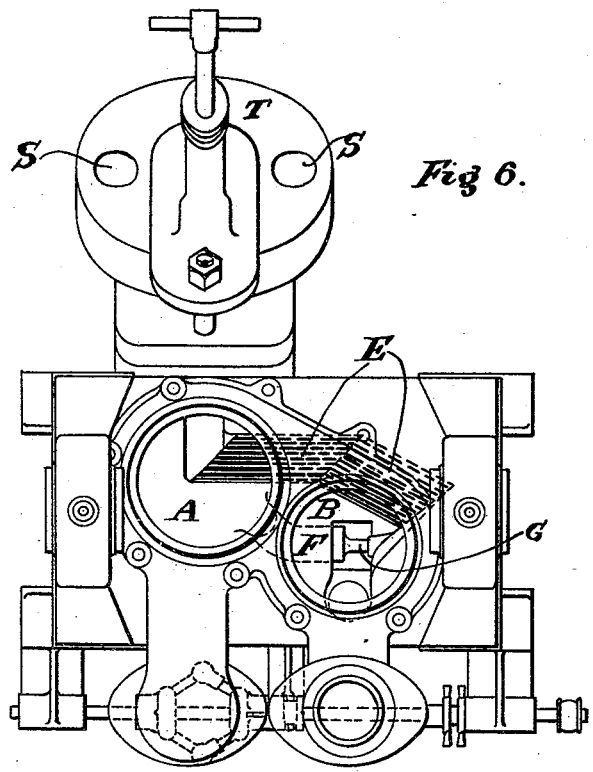
Figure 7:
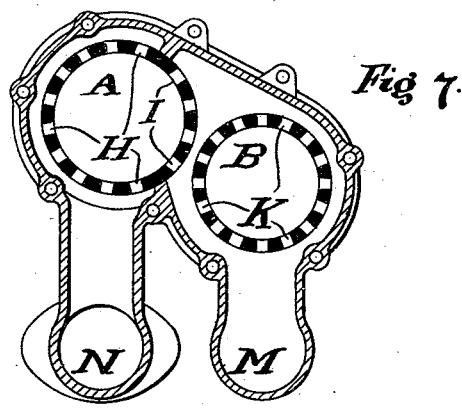

Figure 1 is a side elevation illustrating my invention as applied to a gas-engine. Fig. 2 is a front view of the same. Fig. 3 is a plan view, partly in section. Fig. 4 is a side view, partly in section, showing my invention as applied to hot-air engines burning solid fuel. Fig. 5 is a front view, partly in section, of the same. Fig. 6 is a plan view showing the same application. Fig. 7 is a sectional end view of the cylinders A and B. Fig. 8 is a sectional side view showing the apparatus for causing ignition.

In the accompanying drawings, Figs. 1, 2, and 3, Sheets 1 and 2, show the application of my invention to gas-engines, and the modifications necessary for hot-air engines burning solid fuel are shown in Figs. 4, 5, 6, and 7, Sheets 3, 4, and 5.

I will first describe by reference to Figs. 1, 2, and 3 the engine adapted to burning gaseous fuels. The engine has two single-acting cylinders, the pistons of which are connected in the ordinary manner to a crank-shaft. I call A the "working-cylinder" and B the "distributing-cylinder," their respective pistons being C and D. The piston C is connected to a crank-pin, which is in advance of the crank-pin to which the piston D is connected. The working-cylinder A is constructed with a larger working capacity than the distributing-cylinder B. The difference of these capacities and the angular advance of the working-cylinder crank-pin may vary through a somewhat wide range according to circumstances—such as the desired amount of expansion, the efficiency of the regenerator, the character of the fuel, the desired amount of compression, and other conditions. In the engine shown they are angular and advanced eighty degrees and the working-cylinder is twice the capacity of the distributing-cylinder. I wish it to be understood, however, that these proportions may not be the most suitable, as experience may show that the best results may be obtained with other proportions.

The two cylinders A and B are always in communication with each other at their inner ends, where I place the regenerator E, and also a short direct passage F, with the baffle-valve G, which decides whether the current passes through the regenerator E or the short passage F. The pistons C and D when near the ends of their outward strokes uncover holes H I K for the admission of fresh air and for the exhaust, as will be hereinafter explained.

There is a gas-pump L, which delivers a measured quantity of gas into the space at the inner end of the cylinder A at the proper time. This is a single-acting pump driven in such a manner that the latter part of its compressing-stroke is performed more rapidly than the earlier part, so as to deliver its gas in as short a time as possible. This is accomplished, as shown in Fig. 1, by connecting the piston-rod *m* of said pump to an eccentric *n* on the main shaft, which eccentric has a very short eccentric-rod *o*, so that the backward movement of the piston-rod to deliver the gas will be accomplished very quickly.

The action of the engine is as follows: Commencing with the engine in the position shown in Figs. 1, 2, and 3 at the time when there is the least volume in the spaces between the two pistons C and D, the contents being compressed, the baffle-valve G having just closed the short passage F, so that the communication between the two cylinders A and B is by means of the regenerator E. The gas-pump L is delivering gas into the space at the end of the cylinder A, where it becomes ignited. As the large piston C is now traveling outward, the compressed air in passing from the cylinder B into the cylinder A takes up heat from the regenerator E, meets the gas from the gas-pump L, and they burn together, thus making the working pressure which drives the large piston C outward. The distributing piston D, following it at, say, eighty degrees, commences its outward stroke just before the working-piston A has got half-way on its outward stroke. By this time the gas-pump L has delivered all the gas, and the pressure is falling, due to expansion, both pistons C and D are now traveling outward, causing the pressure to fall rapidly from expansion, and also from the small piston D, drawing the very hot contents of the cylinder A back through the regenerator E. These very hot gases give up a large portion of their heat to the regenerator, and in consequence are reduced very much in volume, and occupy much less space in the distributing-cylinder B than they did in the working-cylinder A, thus adding to the rapid fall in pressure in the working-cylinder A. By the time the working-piston C approaches the end of its working stroke it uncovers the exhaust-holes I in the walls of the working-cylinder A, letting out any excess of pressure above atmospheric pressure (should there be any) through these holes into the exhaust-chamber and into the exhaust-pipe by means of the self-acting exhaust-valve, similar to valve N, (shown in Fig. 4,) which will only allow the gases to pass outward into the exhaust-pipe. Very shortly after opening the exhaust-holes I the working-piston C uncovers the suction-holes A. As the pressure falls below atmospheric pressure air is now drawn in through the suction-self acting valve N, (shown clearly in Fig. 4,) the suction-chamber, and the suction-holes H into the outer end of the working-cylinder A, displacing the hot burned gases, which are drawn toward the inner end through the regenerator E, where, giving up a considerable portion of their heat, they are reduced in volume when they pass into the distributing-cylinder D, so that the distributing-piston D, in its continued outward stroke, is enabled to draw out of the working-cylinder, say, two or three times the volume of burned gases, which are replaced by fresh air drawn in, as above described. This suction continues until the working-piston C has returned, commenced its inward stroke, and closed the suction-holes H, by which time the distributing-piston D, in approaching the end of its outward stroke, uncovers the exhaust-holes K in the walls of the distributing-cylinder B. The working-piston C, as it moves inward, continues to cause the current to pass from the working-cylinder A into the distributing-cylinder B out through the exhaust-holes K and the exhaust-valve M. As, however, a considerable portion of the contents of the working-cylinder A consists of fresh air recently drawn in, the baffle-valve G opens the way through the short passage F soon after the working-piston C has commenced its inward stroke; otherwise the fresh air would be heated up before compression and the regenerator uselessly cooled down. The exhaust continues until the distributing-piston D has returned a short distance on its inward stroke, closing the exhaust-holes K, by which time the working-piston C is about mid-stroke or a little beyond. The fresh air, having been drawn in close to the end of the working-piston C, will have displaced the burned gases, and any of these latter now left in between the two pistons will be mostly near the distributing-piston D, where they will not interfere with the combustion of the gas during the next working stroke. Compression now commences, as both pistons are moving inward and the position commenced with is reached. This completes the cycle which gives a working stroke for each revolution.

As will be observed from an inspection of Fig. 3, Sheet 2, the cylinders A and B are water-jacketed in the working part of the barrels, so as to insure the satisfactory wear of the pistons C and D. The baffle-valve G is placed at the cool end of the regenerator E, where it will not be liable to damage from excessive heat. It may also be partially water-jacketed. It is not necessary that this valve G should be more than approximately tight.

Gas-engines made under this invention, if suitably proportioned, may be constructed without the exhaust-holes I in the working-cylinder A, so that the whole of the exhaust will take place through the exhaust-holes K in the distributing-cylinder B. In these instances the exhaust-valve M is not necessary, and can be dispensed with; also, in any case the suction-valve N is not necessary. As, however, these valves are constructed in a very light manner, are not exposed to any material heat, have to deal with only very moderate pressures, and are not required to be absolutely tight, it may be desirable in most instances to use them.

When a good quality of gas—such as ordinary town illuminating-gas—is used, only a small pump is required, as I prefer not to have gas in excess of the proper proportion required for the fresh air drawn in, but rather considerably below this quantity. To enable it to be burned during the earlier portion of the working stroke, the gas-pump L should be driven by a cam, or, as shown in Fig. 1, Sheet 1, by an eccentric having a very short eccentric-rod, so that it delivers the gas in a short space of time.

The speed of the engine can be controlled by a governor in any well-known manner, either by shutting off the gas entirely, so as to miss delivering any gas during some of the working strokes, or, in addition thereto, I may throttle the gas-admission to the gas-pump L, so that it does not obtain its full volume, which in some instances may be supplemented by air drawn in through a spring-loaded valve. The ignition may be caused by means of a porcelain tube O, Fig. 8, Sheet 6, which passes through the space at the back end of the working-cylinder A, and is open at the top and bottom, being made tight by means of glands packed with asbestos. An external flame is maintained inside the porcelain tube O, and with a view to keeping this tube small in diameter the flame may be supported by means of a jet of air under a light pressure, thus, as much as possible, localizing the heat in one part of the tube O near where the gas from the gas-pump is admitted in jets. Some of the gas coming into contact with the red-hot part of the tube is ignited and inflames the rest. Instead of porcelain, terra-cotta or other refractory material or suitable metal may be used for the tube O. When this form of igniter is used with an oil-engine, as will be hereinafter described, a fine spray of oil may be used in place of the gas for the flame which heats the tube O, the spray being induced by the air-pressure.

The application of this invention to engines burning solid fuel is shown in Figs. 4, 5, 6, and 7, Sheets 3, 4, and 5. The action is just the same as that previously described, excepting that an inclosed furnace P is substituted for the gas-pump. The furnace is kept as small in capacity as convenient, and is connected to the working-cylinder A by the passage R. When compression takes place, some of the fresh air is compressed into the fuel in the furnace P, when its oxygen is converted into carbonic oxides, the heat thus obtained distilling a portion of the fuel into other kinds of combustible gas. As the working-piston C makes its outward working stroke these gases pass out of the furnace, meet the hot air coming from the regenerator E, and are burned, thus making the working pressure. The fuel may be introduced through holes S in the revolving feed-plate T, the rammer U being used to consolidate the fuel in the furnace P. In this engine I have shown the baffle-valve G, Fig. 5, constructed to close only the short passage F, leaving the greater resistance of the gases in passing through the regenerator E to prevent any material portion passing that way when the short passage F is open.

The governor-valve V, Fig. 4, is a small valve kept closed by means of a spring, but opened by another spring operated by the governor when the speed increases beyond that to which the governor is adjusted. The result is that as compression would otherwise take place in the engine, this valve being opened by the governor more or less prevents it, and less air is compressed into the fire, a lower working pressure is obtained, and less fuel burned.

The arrangement of engine constructed under this invention for the use of oil or liquid fuel is the same as previously described for those using gaseous fuel when the oil is pure, and will burn completely away, leaving scarcely any solid residuum, an oil-pump being substituted for the gas-pump L. When, however, thick impure oils, tar, or fatty matter is employed as fuel, I construct the engine more like the engine described for using solid fuel, the oil being injected onto a small furnace containing incandescent fuel-clinkers or suitable refractory materials. Some of the air may be compressed into this small furnace, or a portion or the bulk of it passed through, as may be most suitable to the fuel to be used.

Having fully described my invention, what I claim, and desire to secure by Letters Patent, is—

1. In an internal-combustion heat-engine, the combination of the working-cylinder A, the distributing-cylinder B, the exhaust-holes K, (with or without the exhaust-holes I,) the suction-holes H, (with or without the valves M and N,) the regenerator E with the baffle-valve G, and the short passage F, substantially as described.

2. In an internal-combustion heat-engine burning gaseous fuel, the working-cylinder A, the distributing-cylinder B, the exhaust-holes K, (with or without the exhaust-holes I,) the suction-holes H, (with or without the valves M and N,) the regenerator E with the baffle-valve G, and the short passage F, in combination with the gas-pump L, substantially as described.

3. In an internal-combustion heat-engine burning-liquid-fuel, the working-cylinder A, the distributing-cylinder B, the exhaust-holes K, (with or without the exhaust-holes I,) the suction-holes H, (with or without the valves M and N,) the regenerator E with the baffle-valve G, and the short passage F, in combination with an oil-pump, substantially as described.

4. In an internal-combustion heat-engine burning solid fuel, the working-cylinder A, the distributing-cylinder B, the exhaust-holes K, (with or without the exhaust-holes I,) the suction-holes H, (with or without the valves M and N,) the regenerator E with the baffle-valve G, and the short passage F, in combination with the furnace P, substantially as described.

5. In an internal-combustion heat-engine, a working-cylinder, as A, a tube of refractory material, such as porcelain, passing through the rear end thereof, a gas or oil jet extending into said tube for heating the same, and an air-pipe for supplying a blast of air to said tube, substantially as described.

JAMES ATKINSON.

Witnesses:
T. J. OSMAN,
    17 *Gracechurch St., London, E. C.*
JOSEPH LAKEY,
    17 *Gracechurch Street, London.*